United States Patent [19]

Candido

[11] Patent Number: 5,329,324

[45] Date of Patent: Jul. 12, 1994

[54] TRANSPARENCY PROTECTOR

[75] Inventor: Thomas A. Candido, Hauppauge, N.Y.

[73] Assignee: Enbee Plastics, Inc., Long Island City, N.Y.

[21] Appl. No.: 137,427

[22] Filed: Oct. 18, 1993

Related U.S. Application Data

[63] Continuation-in-part of Ser. No. 25,619, Mar. 3, 1993.

[51] Int. Cl.$^5$ .............................................. G03B 21/11
[52] U.S. Cl. ............................... 353/120; 353/DIG. 5;
  40/159.2; 40/156
[58] Field of Search .......... 353/120, DIG. 3, DIG. 5;
  40/152, 159.2, 156; 206/449, 450

[56] References Cited

U.S. PATENT DOCUMENTS

| | | | |
|---|---|---|---|
| 4,402,585 | 9/1983 | Gardlord | 353/120 |
| 4,810,544 | 3/1989 | Hickman | 428/40 |
| 5,237,355 | 8/1993 | Kiehne et al. | 353/120 |
| 5,266,987 | 11/1993 | Kiehne et al. | 353/120 |

Primary Examiner—William A. Cuchlinski, Jr.
Assistant Examiner—William C. Dowling
Attorney, Agent, or Firm—Michael Ebert

[57] ABSTRACT

A protector adapted to accommodate a transparency inserted therein in a moist state, the transparency drying out while in the protector and being thereafter maintained in clean, dust-free and dry condition so that it is useable with an overhead optical projector which casts the image carried by the transparency onto a viewing screen. The protector is constituted by an open-ended, rectangular sleeve formed of moisture-impermeable transparent synthetic plastic film material of high strength having front and rear panels between which the inserted transparency is sandwiched, and a sheet of hygroscopic transparent acetate film which is interposed between the moist transparency and the front panel. The sheet act to absorb moisture from the transparency and to dissipate it, thereby drying out the transparency.

8 Claims, 3 Drawing Sheets

TRANSPARENCY PROTECTOR

RELATED APPLICATION

This applications is a continuation-in-part of my co-pending application Ser. No. 08/025,619, filed Mar. 3, 1993, entitled "Transparency Protector", the entire disclosure of which is incorporated herein by reference.

BACKGROUND OF INVENTION

1. Field of Invention

This invention relates generally to protectors for storing overhead transparencies, and more particularly to a protector of this type adapted to accommodate a transparency inserted therein in a moist state, the transparency drying out while in the protector and being thereafter maintained in a clean, dust-free and dry condition so that it may be used with an overhead optical projector which casts image carried by the transparency onto a viewing screen.

2. Status of Prior Art

When lecturing before a class, making a business presentation in a board room or in some other setting imparting information to an audience, it is common practice to make use of visual aids in the form of transparencies. These transparencies carry images of charts, graphs, drawings, pictures and other forms of data. The image appearing on a transparency is magnified and cast on a large screen viewable by the audience by means of an overhead optical projector.

A typical transparency for use with an overhead projector is a rectangular film 8½ × 11 inches in size, the film being about 3 mils thick. In order to maintain the transparency in a clean, dust-free condition, it is conventional to jacket the transparency within a transparent envelope or protector made of polyethylene, polypropylene or other synthetic-plastic film material of high clarity and strength.

The transparency is sandwiched between the clear front and rear panels of the protector. The length of the protector is about the same as that of the transparency, but its width is about a half inch greater to define a side margin in which a set of holes is punched so that the protector can be stored in a ring binder or file.

Thus, when a lecture is to be given in a lecture hall, the lecturer brings to the hall a ring binder containing the transparency protectors that are to be used as visual aids in the course of the lecture. Then after being removed from the ring binder, each transparency protector, at the appropriate time, is placed on the horizontal stage of the overhead projector so that the projected image of the transparency can be cast onto the screen and viewed by the audience.

The envelope or protector disclosed in the Gardlund U.S. Pat. No. 4,402,585 is constituted by a rectangular pocket of transparent polypropylene film which is open along one longitudinal side edge to permit the insertion of a transparency between the front and rear panel of the sleeve. At least one opaque flap is attached in a foldable manner along one of the longitudinal side edges of the pocket, the flap being attached to and spaced a distance from the longitudinal edge such that holes may be punched in the sheet material along the side edge to permit storage in a binder, file or the like.

Transparencies carrying images are developed and printed in an ink jet, bubble jet, thermal transfer or other processing machine and usually emerge from the machine in a moist state, the transparency then being inserted in a protector to maintain it in a clean, dust-free condition. When the protector is made of Mylar polyester or other high strength synthetic plastic film material which is impermeable to moisture, the moist transparency is unable to dry out unless kept in storage for a prolonged period. As a consequence, if the transparency is still moist when the transparency-loaded protector is put to use in an overhead projector, the residual moisture will impair the clarity of the projected image.

To overcome this drawback, it is known to provide a protector formed entirely of breathable acetate film formed of cellulose acetate resin. One such protector is disclosed in the Hichman U.S. Pat. No. 4,810,544. This protector is formed of a blank of diacetate film that is folded to form the front and rear panels of the protector. The rear panel is of greater width to form a flap that is folded over to form a margin at a side edge of the folder which is provided with a set of punch holes so that the protector can be stored in a ring binder or file.

However, acetate film is relatively weak. Hence, in order to prevent tearing of the protector at the punch holes, adhered to the flap is a strip of double-face, pressure-sensitive tape to reinforce the margins of the protector. A protector of this type is more expensive to make than one made of synthetic plastic film material such as polypropylene, for acetate or diacetate, formed by two groups of acetate, is costly. Moreover, the need to add an adhesive tape strip to the diacetate protector adds substantially to the cost of manufacturing this protector.

My above-identified co-pending patent application discloses a protector which is a composite of a front panel formed of breathable cellulose acetate film material and a rear panel formed of transparent, synthetic, plastic film material such as polypropylene of relatively high strength, whereby when the protector is loaded with a transparency in a moist state, the transparency will quickly dry out.

This protector is constituted by an open-ended rectangular sleeve whose dimensions are appropriate to those of the transparency, the sleeve including a front panel formed of transparent, acetate film that is breathable to permit a transparency inserted in the sleeve in a wet state to dry out. Also included is a rear panel formed of a transparent, synthetic plastic film of high strength having the same length as the front panel and joined thereto at one side edge to form a folder to receive the transparency so that it is then sandwiched between the panels. The width of the rear panel is greater than that of the front panel to form a flap that is folded over to define at the other side edge of the sleeve a high-strength margin that can be provided with a set of punch holes whereby the transparency-loaded protector can be kept, when not in use, in a ring binder or file.

SUMMARY OF INVENTION

In view of the foregoing, the main object of this invention is to provide an improved protector adapted to accommodate a transparency inserted therein in a moist state, the transparency drying out while in the protector and being thereafter to maintain in a clean, dust-free and dry condition so that it may be used with an overhead optical projector to cast the image carried by the transparency onto a viewing screen.

More particularly, an object of this invention is to provide an improved protector constituted by an open-ended rectangular sleeve formed of moisture-impermeable transparent synthetic plastic material of high strength having front and rear panels between which is sandwiched the transparency in the moist state, and a sheet of hygroscopic transparent cellulose acetate film which is interposed between the moist transparency and the front panel and acts to absorb moisture from the transparency and to dissipate it, thereby drying out the transparency.

A significant advantage of a protector in accordance with the invention is that the sleeve may be formed from a single rectangular sheet of film which is folded to define a folder to snugly receive the transparency, as well as a punch-hole margin so that the protector can be stored in a binder or file.

Another advantage of the invention is that the hygroscopic acetate sheet which overlies the transparency stored in the protector, acts to inhibit ambient moisture from migrating into the dry transparency, so that the transparency remains dry even when the protector is stored in a humid atmosphere.

Still another object of the invention is to provide a "focus" transparency which can be stored in a protector and whose image is that of a test pattern useable in conjunction with a registration device for centering and focusing of the overhead optical projector before beginning a presentation of visual-aid transparencies.

Briefly stated, these objectives attained in a protector that includes an open-ended rectangular sleeve formed by a blank of moisture-impermeable transparent synthetic plastic material of high strength, such as polypropylene that is folded on a first transverse fold line to define a front panel that overlies a rear panel of greater width that extends beyond the front panel and is folded on a second transverse fold line over the rear panel to form a flap whose section of the flap adjacent the second fold line is bonded to the rear panel to create a punch-hole side margin for the protector so that it can be stored in a binder or file, the remaining section of the flap forming a pocket to receive one edge of the transparency sandwiched between the panels, the other edge being adjacent the first fold line whereby the transparency is snugly held within the sleeve.

The protector further includes a sheet of hygroscopic transparent cellulose acetate film that is interposed between the front panel and the moist transparency, the sheet acting to absorb moisture from the transparency and to dissipate it, thereby drying the moist transparency. And the sheet also acts to inhibit ambient moisture in the prevailing atmosphere from migrating into the dry transparency.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

First Embodiment

Figure 1:
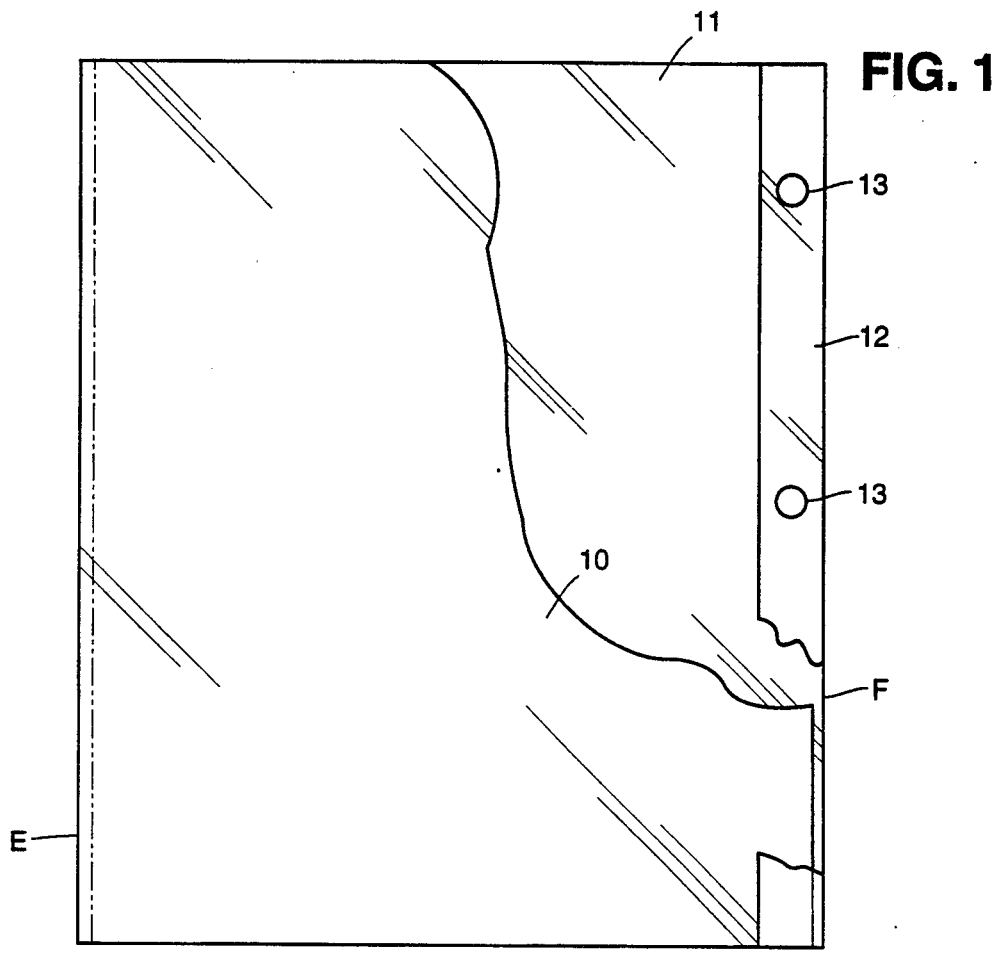
FIG. 1 is a plan view of one embodiment of a protector in accordance with the invention.
Figure 2:
FIG. 2 is an end view of the protector.
Figure 3:
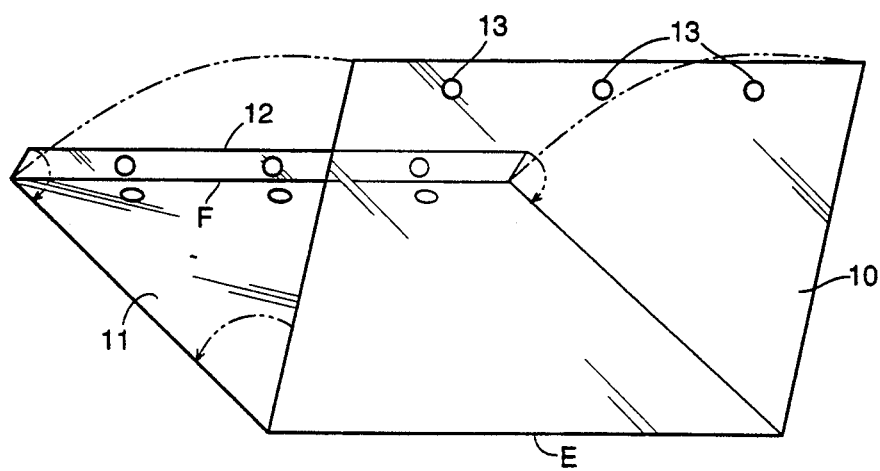
FIG. 3 is a perspective view of the protector, showing the front panel unfolded from the rear panel.

Referring now to FIGS. 1 to 3, a protector in accordance with the invention, in the embodiment shown in these figures, is constituted by an open-ended rectangular sleeve whose dimensions are such as to snugly accommodate a typical $8\frac{1}{2} \times 11$ inch transparency.

The protector includes a front panel 10 formed of acetate film material. By acetate film is meant a durable, highly transparent film with non-deforming characteristics, produced from cellulose acetate resin. Included in this definition is diacetate film. The protector also includes a rear panel 11 which is preferably formed of transparent polypropylene films, a thermoplastic polymer of high strength, far greater than that of cellulose acetate, but of substantially lower cost. In practice, other synthetic plastic films, such as Mylar polyester or polyethylene, may be used in lieu of polypropylene.

Front panel 10, which is superposed on rear panel 11 and has the same length, is adhesively bonded or otherwise joined to the rear panel at its left side long edge E, thereby creating a folder into which one inserts the transparency to be stored so that the transparency is then sandwiched between the front and rear panels.

The width of rear panel 11 is greater than that of the front panel (about $\frac{1}{4}$ inch) to form a flap 12 that is folded on fold line F over the front panel as shown in FIG. 2 at the long right edge of the protector to define a narrow margin on which is punched a set of three equispaced holes 13 which, as best seen in FIG. 3, go through flap 12, front panel 10 and rear panel 11. As a consequence, these holes are highly resistant to tearing; for while the acetate film front panel 10 is relatively weak, it is sandwiched at the margin of the protector by the high strength polypropylene flap 12 and rear panel 11.

The acetate film which forms front panel 10 is "breathable;" that is to say, it is permeable to moisture. Hence, when a transparency is inserted between the front and rear panels of the protector and the face of the transparency which carries an image is in a moist state, having just emerged from the machine producing the transparency, the moisture is free to evaporate and pass through the acetate front panel overlying the face of the transparency.

It is desirable to insert the transparency in the protector while it is still in a moist state, for otherwise if the transparency is exposed in its wet state, it may become contaminated by atmospheric dust and other particles. But while initially the transparency is moist, it dries out in the protector, so that when the loaded protector is put to use in an overhead optical projector, it is in a dry state and there is no residual moisture to impair the clarity of the projected image.

Second Embodiment

Figure 4:
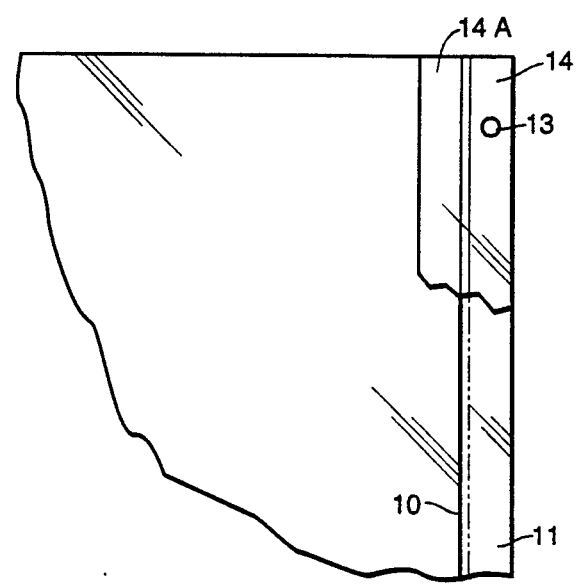
FIG. 4 illustrates a second embodiment of a protector in accordance with the invention.

The embodiment of the protector shown in FIG. 4 is the same as that shown in FIG. 1, except that the flap extension 14 is about twice as wide as flap 12 in FIG. 1 and when folded over, half of the wider flap is adhesively or otherwise bonded to the right margin of the rear panel 11, the remaining half 14A being free and forming a pocket so that the margin of front panel 10 may be inserted therein to close the folder.

The advantage of the second embodiment of the protector over the first embodiment is that in the first embodiment a rectangular transparency inserted between front panel 10 and rear panel 11 must be of about the same length as these panels but not as wide, for the transparency must fall short of the punch-hole margin formed by flap 12, so that the protector can be put in a binder. Because of this the transparency is free to shift within the protector.

In the second embodiment shown in FIG. 4, the punch-hole margin 14 is bonded, and the transparency cannot shift into the margin but is snugly held within the protector.

Third Embodiment

In the third embodiment of a transparency protector in accordance with the invention, as shown in FIGS. 5 to 10, the protector includes a rectangular sleeve 15 (FIG. 5) similar to the sleeve shown in the second embodiment (FIG. 4) except that the sleeve 15 is made exclusively of moisture-impermeable transparent synthetic plastic film of high strength, preferably polypropylene of high clarity and archival quality. Other film materials are also useable such as Mylar polyester and polyethylene.

The portector further includes a rectangular sheet 16 (FIG. 7) having about the same dimensions as the transparency for which the sleeve has been dimensioned, sheet 16 being formed of transparent, breathable acetate film having hygroscopic properties and therefore readily absorbs moisture. The thickness of the film which forms sleeve 15 and of the acetate film which forms sheet 16 is preferably in the range of 2 to 3 mils.

Figure 6:
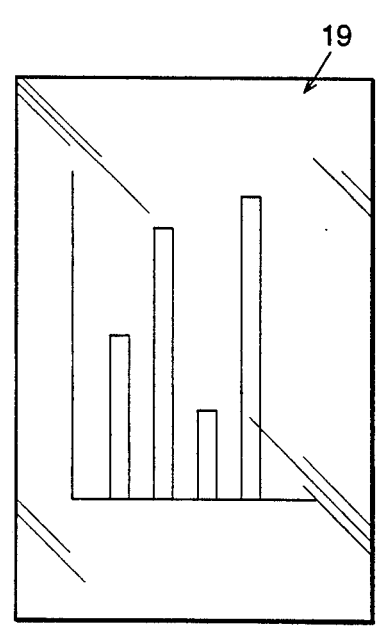
FIG. 6 is a plan view of the acetate sheet included in the acetate sleeve included in the protector.
Figure 7:
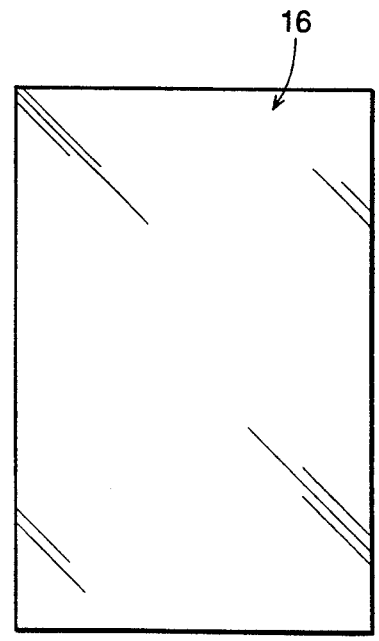
FIG. 7 is a plan view of a typical transparency that is inserted in the protector.

Sleeve 15 includes a rear panel 17 and a front panel 18 which together form a folder into which is inserted a transparency 19 in a moist state. By way of example transparency 19 is shown in FIG. 6 as having an image in the form of a graph. Also inserted in the folder and completing the protector is acetate sheet 16 which is interposed between transparency 19 and front panel 18.

Figure 8:
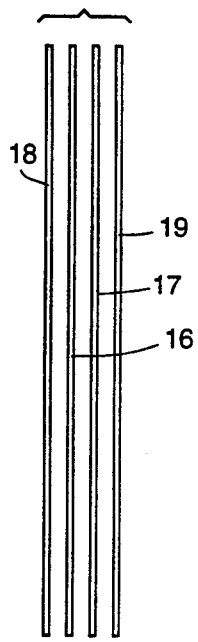
FIG. 8 schematically illustrate the relationship of the elements in the transparency-loaded protector.

FIG. 8 schematically illustrates the relationship of the front and rear panels of the sleeve to the transparency and the acetate film sandwich between the panels. In the absence of the acetate sheet, the moisture-impermeable front panel 18 of the sleeve would block the escape of moisture from the moist face of the transparency 19. But with the hygroscopic sheet 16 overlying the moist transparency, the moisture is quickly absorbed by the sheet, thereby drying the transparency and maintaining it in a dry, clear state.

The moisture absorbed by the acetate sleeve is gradually dissipated through the open ends of the sleeve. And the hygroscopic sheet also acts to inhibit the migration of ambient moisture from the atmosphere into the transparency.

Figure 5:
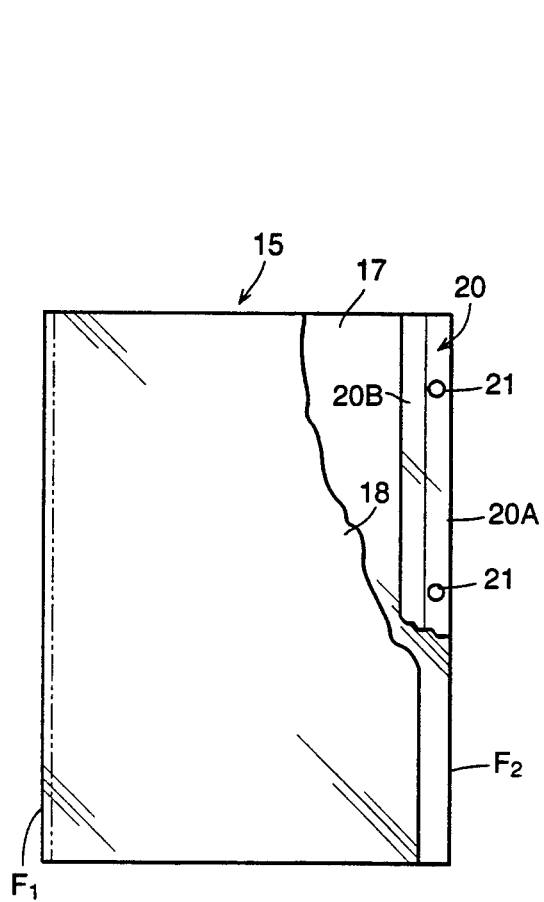
FIG. 5 is a plan view of the acetate sleeve of a third embodiment of a protector in accordance with the invention.
Figure 9:
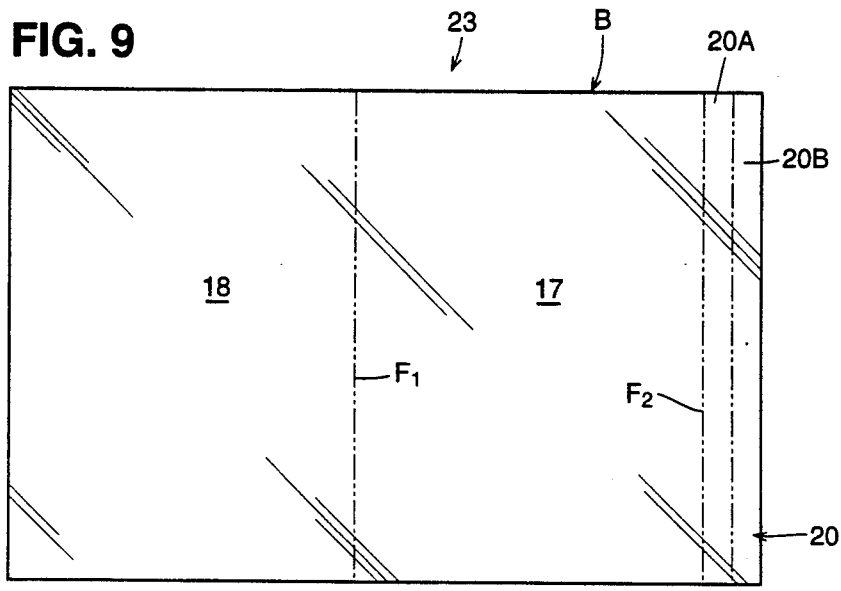
FIG. 9 illustrates the blank from which the sleeve is formed.
Figure 10:
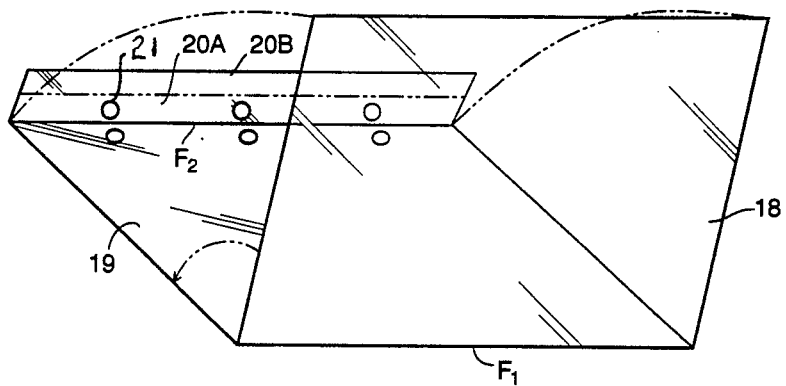
FIG. 10 shows how the blank is folded to create the sleeve.

As shown in FIG. 9, sleeve 15 is fabricated from a single rectangular blank 23 of film material that is scored to provide transverse fold lines $F_1$ and $F_2$. Line $F_1$ divides the blank into front panel 18 and rear panel 19 which is somewhat wider, the fold line $F_2$ at the margin of rear panel 19 defining a flap 20. Flap 20 is provided with a longitudinal section 20A adjacent fold line $F_2$ and a parallel section 20B. As shown in FIGS. 5 and 10, flap 20 is folded over rear panel 17, the section 20A of the flap being adhesively or otherwise bonded to the rear panel to form a punch-hole margin, section 20B forming a locking pocket.

Holes 21 are punched in the bonded margin of the sleeve so that the transparency loaded protector can be stored in a ring binder or suitable file. The locking pocket created by flap section 20B is adapted to receive the outer edges of the transparency and the acetate sheet inserted in the folder formed by the panels and also the outer edges of the front panel so that neither the transparency or the acetate sleeve can slip out of the folder. Because of the folder arrangement, delicate transparencies can be loaded into the sleeve of the protector without any sliding that might give rise to scratching or wrinkling of the transparencies.

In those situations where the transparency is in a completely dry state before being put into the protector, it is not necessary to use the acetate sleeve. However, the sheet is still useful to protect a dry transparency from ambient moisture migrating into the open-ended sleeve.

Focus Transparency

A standard optical overhead projector for transparencies is provided with a horizontal stage on which is laid a transparency-loaded protector whose image is magnified and cast on a screen so that it can be viewed by an audience.

Such projectors are provided with a registration mechanism for centering and focusing the projector prior to beginning a presentation. If in adjusting the centering and focusing of the projector one uses for this purpose a typical transparency such as that shown in FIG. 2 where the image is that of a graph, while with this image one is able without too much difficulty to make an adjustment of the registration mechanism to bring the image in exact focus on the screen, it is more difficult to effect centering, for there are no guide lines on the image that are helpful in this regard.

Figure 11:
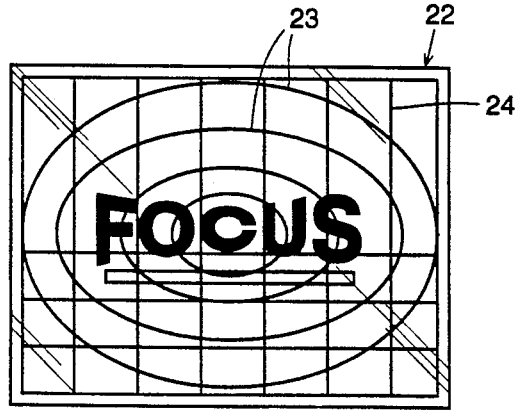
FIG. 11 illustrates a "focus" transparency in accordance with the invention.

In a focus transparency 22, as shown in FIG. 11, which can be inserted in a transparent protector in accordance with the invention, the image on this transparency is a distinctive test pattern that facilitates setting the centering and focusing of the overhead projector by means of its registration mechanism.

The test pattern is formed by the word FOCUS whose C surrounds the dead center of the pattern. Concentric with the C are a series of ovals 23 of progressively greater size, the ovals intersecting the horizontal and vertical lines of a rectangular grid 24.

This test pattern makes it possible for an operator to adjust and exactly set the optical projector so that it projects focused and properly centered transparency images on a screen.

While these have been disclosed and illustrated preferred embodiments of the invention, it will be appreciated that many changes and modifications therein may be made therein however departing from the essential spirit thereof.

I claim:

1. A protector adapted to accommodate a transparency so that it may be used with an overhead optical projector to cast an image carried by the transparency onto a viewing screen, the protector comprising an open-ended rectangular sleeve formed of transparent synthetic plastic film material of high strength whose dimensions are appropriate to those of the transparency, said sleeve having a front panel folded at a first fold line over a rear panel of the same length to form a folder to receive the transparency whose inner edge is then adjacent the first fold line, said rear panel having a greater width than the width of the front panel and having a second fold line which defines a flap extending beyond the front panel, said flap being folded over the rear panel, said flap having a section adjacent the second fold line that is bonded to the rear panel to define a margin in which holes are punched so that the protector can be stored in a ring binder or other file, and a parallel section defining a locking pocket which receives the outer edge of the transparency and the corresponding edge of the front panel whereby the transparency is locked in the sleeve.

2. A protector as set forth in claim 1, in which the sleeve is formed of polypropylene film.

3. A protector as set forth in claim 2, in which the film has a thickness in the range of about 2 to 3 mils.

4. A protector as set forth in claim 1, in which the sleeve is formed of polyester.

5. A protector as set forth in claim 1, for a transparency that is inserted therein in a moist state, the protector acting to dry out the transparency and to maintain it in a dust-free and dry condition, said protector further including a sheet of transparent hygroscopic material that is interposed in the sleeve between the front panel and the moist transparency and acts to absorb mosture therefrom.

6. A protector as set forth in claim 5, in which the sleeve is formed of acetate film.

7. A protector as set forth in claim 1, wherein the image on the transparency is a test pattern to facilitate focusing and centering the optical projector.

8. A protector as set forth in claim 1, in which the sleeve is formed from a single blank of film material that is scored to define the first and second fold lines.

* * * * *